Nov. 21, 1950     J. J. ROSE     2,531,297
PLANTING IMPLEMENT
Filed Jan. 16, 1947     2 Sheets-Sheet 1

Inventor
John J. Rose

By Clarence A. O'Brien
and Harvey B. Jacobson
*Attorneys*

Nov. 21, 1950     J. J. ROSE     2,531,297
PLANTING IMPLEMENT

Filed Jan. 16, 1947     2 Sheets-Sheet 2

Inventor
John J. Rose

By Clarence A. O'Brien
and Harvey B. Jacobson
Attorneys

Patented Nov. 21, 1950

2,531,297

UNITED STATES PATENT OFFICE 2,531,297

PLANTING IMPLEMENT

John J. Rose, McMechen, W. Va.

Application January 16, 1947, Serial No. 722,320

3 Claims. (Cl. 294—50.7)

This invention relates to new and useful improvements and structural refinements in planting implements, and the principal object of the invention is to provide a device of the character herein described, which may be conveniently and effectively employed for the formation of holes in the ground, in which the plants may be subsequently positioned.

The formation of such holes is usually effected by means of a pointed stake, or the like, which not only is a tedious task since the worker usually kneels on the ground, but which also results in the formation of downwardly tapered apertures conforming to the contour of the particular stake employed. Such apertures are wholly unsuitable for transplanting purposes, since the relatively restricted inner or lower extremity of the aperture is not sufficiently large to accommodate the roots of the plant, so that as a result, the roots frequently are broken during the transplantation and the plant fails to survive. A further object of the invention is to eliminate the disadvantages above outlined by providing an implement which will facilitate the formation of straight-walled holes, and which may be conveniently and effectively manipulated while the worker remains in a substantially upright position.

Another object of the invention is to provide a planting implement which, by virtue of its rapid and convenient operation, will substantially increase the speed of transplantation, if compared with the conventional stake, or the like, employed for a similar purpose.

An additional object of the invention is to provide a planting implement which is simple in construction, which will not easily become damaged, and which will readily lend itself to disassembly for purposes of cleaning, inspection and repairs.

A still further object of the invention is to provide a planting implement which will readily lend itself to economical manufacture and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which.

Like characters of reference are used to designate like parts in the specification and throughout the several views.

Figure 1:
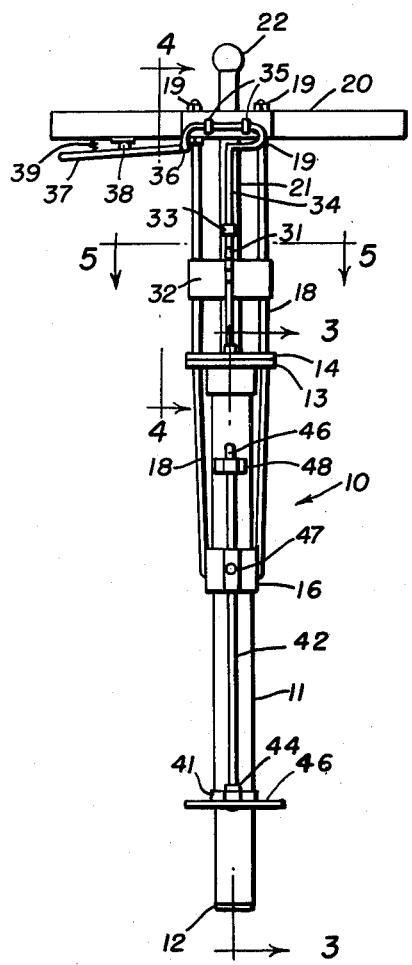
Figure 1 is a front elevation of the invention.
Figure 2:
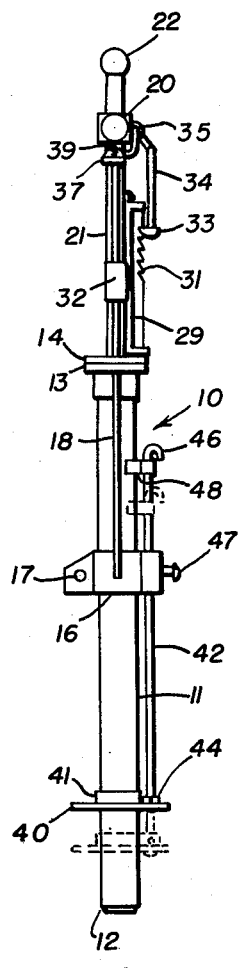
Figure 2 is a side elevation thereof.

Referring now to the accompanying drawings in detail, the invention consists of a planting implement designated generally by the reference character 10, the same embodying in its construction a substantially tubular housing 11 provided at one end thereof with an externally chamfered portion 12, so that it may be conveniently pressed into the ground.

The remaining end portion, that is, the upper end portion of the housing 11 is equipped with a relatively flat cap or cover 13, to which is secured a resilient pad 14. Both the cap and the cover are formed with a central aperture or opening 15, the purpose of which will be hereinafter more fully explained.

A clamping block 16 is secured intermediate the ends of the housing 11 by means of a clamping screw 17, and a pair of upwardly extending tie rods 18 are secured at the lower ends thereof to this block, as is best shown in Figure 1.

The rods 18 pass through the aforementioned cap and pad 13, 14 respectively and the upper end portions of the rods are rigidly connected or clamped by means of the nuts 19 to a transversely extending handle 20.

Figure 3:
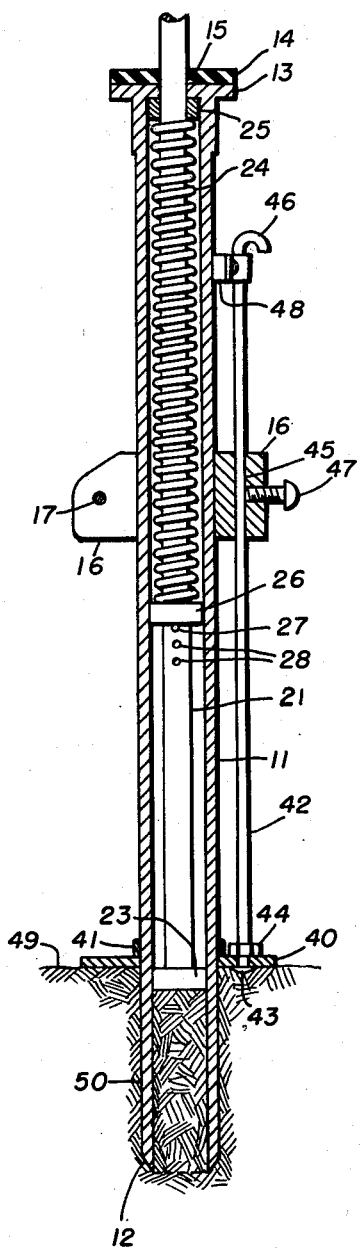
Figure 3 is a cross sectional view, taken substantially in the plane of the line 3—3 on Figure 1.
Figure 4:
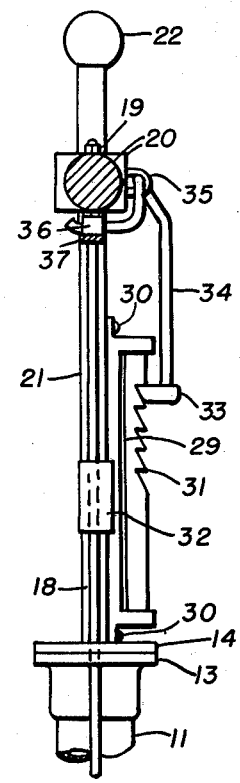
Figure 4 is a cross sectional view, taken substantially in the plane of the line 4—4 in Figure 1.
Figure 5:
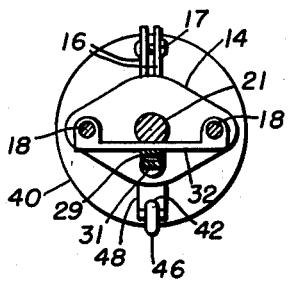
Figure 5 is a cross sectional view, taken substantially in the plane of the line 5—5 in Figure 1.

A plunger rod 21, extending longitudinally in the housing 11, passes slidably through the opening 15 and the upper end portion of the rod is slidably receivable in a further opening (not shown) provided in the handle 20. The upper extremity of the rod 21 terminates in a suitable knob 22, while a plunger disc 23 is secured to the lower, that is, the inner extremity of the rod, as is best shown in Figure 3. The disc 23 is slidable in the lower end portion of the housing 11 and is normally urged downwardly, that is, outwardly from the housing by means of a compression spring 24 positioned on the enclosed portion of the rod 21. One end of this spring bears against a loosely fitting washer 25 in contact with the inner surface of the cap 13, while the remaining end of the spring engages a collar 26 slidably positioned on the rod 21. The collar 26 is adjustably secured in position by means of a transversely extending pin 27 which is selectively receivable in a plurality of vertically aligned apertures 28 provided (in a transversely extending relation) in the rod 21.

An elongated bracket 29 is secured by means of the bolt 30 to the exposed upper end portion of the rod 21, the bracket 29 providing a support for a toothed rack 31. It will be noted that the exposed portion of the rod 21 is also equipped with a guide 32, this being slidably positioned on the rods 18, as will be clearly apparent.

A detent 33 is selectively engageable with the teeth of the rack 31, the detent 33 being secured at one end of an arm 34 which is configurated substantially as shown and is pivotally attached (as at 35) to the intermediate portion of the handle 20. The remaining end portion of the arm 34 is pivotally connected as at 36 to a further lever 37 which, in turn, is pivotally connected intermediately of its length as at 38 to one end portion of the handle 20, as will be clearly apparent. A suitable compression spring 39 is interposed between the handle 20 and the free end portion of the lever 37, whereby the detent 33 is normally urged in engagement with the rack 31 through the medium of the arm 34.

The invention also includes a flange plate 40 which is slidably positioned on the lower end portion of the housing 11, the plate 40 being provided with a suitable guiding ring 41 and having connected thereto an upwardly extending control rod 42. The lower end of the latter is peened over as at 43 and is equipped with a clamping nut 44, whereby the control rod and the plate 40 are rigidly secured together, as will be clearly apparent. The control 42 passes slidably through a bore 45 formed in the aforementioned block 16 and terminates at the upper end thereof in a downwardly arcuated hook portion 46.

A clamping bolt 47, provided in the block 16, is engageable with the rod 42, and a guide block 48, secured to the upper end portion of the rod 42, slidably engages the housing 11, as will be clearly apparent.

Having thus described the construction of the invention, the modus operandi thereof will now be explained.

The lower end portion of the housing 11 is placed upon the ground (indicated at 49) and by simply pressing downwardly upon the handle 20, the lower end portion of the housing will be pressed into the ground, substantially as shown in Figure 3.

During this action, the resultant upward pressure against the disc 23 will overcome the resiliency of the spring 24 and as a result, the plunger disc 23 and rod 21 will be slid upwardly, together with the associated rack 31.

Accordingly, the detent 33 will successively engage the correspondingly lower teeth of the rack 31 and by virtue of this engagement, the rod 21 and the disc 23 will be releasably retained in a retracted position, within the housing 11.

The insertion of the lower end portion of the housing in the ground will result in the formation of a hole or aperture 50, so that when the implement is subsequently withdrawn from the ground, a plant may be inserted in this aperture, as will be clearly apparent. It should be noted that the apertures formed will have a substantially straight lateral wall, so that the root of the plant may be conveniently accommodated therein, as has been explained in the opening paragraphs of this specification.

When employing pointed stakes in the formation of apertures (as has been the conventional practice), the earth displaced by such formation is not, in effect, removed, but is simply compressed, as it were, to form the tapered wall of the aperture thus provided. However, when using the instant invention, the earth displaced by the formation of the aperture, will, in effect, be removed, this being accomplished by simply withdrawing the lower end portion of the implement from the ground.

The displaced earth will accumulate in the lower end portion of the housing 11 and, after the implement has been withdrawn from the ground, this earth may be easily and conveniently discharged by simply pressing the lever 37 and thereby disengaging the detent 33 from the rack strip 31. By virtue of this disengagement, the rod 21 and the disc 23 will be projected, as it were, toward the lower end of the housing by the resiliency of the spring 24 and accordingly, the material (earth) accumulated in the lower end portion of the housing will be effectively discharged.

The extent to which the housing 11 may be inserted in the ground is governed by means of the plate or flange 40, the position of the latter, in turn, being adjusted by virtue of the rod 42. In other words, by simply loosening the screw 47, the rod 42 may be slid together with the associated plate 40, so that the plate will form an effective stop, when the housing 11 has been inserted in the ground to the required depth.

Finally, it will be noted that the length of the rack 31 is relatively short with respect to the portion of the housing 11 which may be inserted in the ground. In this connection, it should be explained that the movement resulting from the insertion of the housing in the ground is not concurrent with the relative movement of the rack 31 with respect to the detent 33, since the earth will withstand a certain amount of compression before and during the retraction of the plunger disc 23. In other words, the earth displaced by the formation of the aperture 50 will accumulate in the lower end portion of the housing 11 in a compressed cylindrical form, while the movement of the rack 31 with respect to the detent 33 will be relatively small. Accordingly, the earth, when subsequently discharged from the lower end of the housing, will be in a compressed form, as will be clearly understood. The extent of compression of the earth is, of course, governed by the amount of moisture present therein, and by other factors, and in order to compensate for this varying compressibility, the adjustment facilitated by the selective positioning of the pin 27 in the apertures 28 is provided. By virtue thereof, the resiliency of the spring 24 may be increased or decreased as required by the characteristics of the earth where the invention is employed.

It is believed that the advantages and use of the invention will be clearly apparent from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A planting implement comprising in combination, a substantially tubular housing adapted at the lower end thereof for insertion in the ground, a transversely extending handle secured to the upper end of said housing, a slidable rod extending longitudinally in said housing, a plunger disc secured to the lower end of said rod, a compression spring for urging said plunger disc outwardly from said housing, a rack provided adjacent the upper end of said rod, a control lever pivotally mounted on said handle, a detent provided on said lever, resilient means for urging said detent in engagement with said rack whereby said plunger disc may be releasably retained in a retracted position against the resiliency of said spring, and adjustable means for restricting the extent of insertion of said housing in the ground.

2. The device as defined in claim 1, in which said adjustable means comprises a flange slidable on the lower end portion of said housing, an upwardly extending control rod connected to said flange, and a clamping screw engageable with said control rod.

3. In a planting implement, the combination of a substantially tubular housing adapted at the lower end thereof for insertion in the ground, a pair of spaced parallel tie rods extending upwardly from said housing, a transverse handle secured to the upper ends of said tie rods, a slidable rod extending longitudinally in said housing, a plunger disc at the lower end of said rod, the upper end portion of said slidable rod being disposed between said tie rods and extending through said handle, resilient means for urging said slidable rod downwardly, and means for releasably retaining the slidable rod in an upwardly slid position, said last mentioned means including a rack provided on said slidable rod between said housing and said handle, an arm pivoted to said handle and provided with a detent engageable with said rack, a control lever pivoted on the underside of one end portion of said handle, and linkage operatively connecting said lever to said arm, said lever being depressible toward said handle whereby said detent may be disengaged from said rack.

JOHN J. ROSE.

REFERENCES CITED

The following references are of record in the file of this patent:

UNITED STATES PATENTS

| Number | Name | Date |
|---|---|---|
| 669,841 | Koeth | Mar. 12, 1901 |
| 1,225,188 | Smith | May 8, 1917 |
| 1,455,144 | Moors | May 15, 1923 |
| 1,692,436 | Deane | Nov. 20, 1928 |
| 1,783,026 | Ober | Nov. 25, 1930 |
| 1,860,963 | Smith | May 31, 1932 |

FOREIGN PATENTS

| Number | Country | Date |
|---|---|---|
| 598,340 | Germany | June 9, 1934 |